United States Patent
Igarashi

(10) Patent No.: US 8,006,572 B2
(45) Date of Patent: Aug. 30, 2011

(54) DIFFERENTIAL-PRESSURE FLOW METER AND FLOW-RATE CONTROLLER

(75) Inventor: Hiroki Igarashi, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 186 days.

(21) Appl. No.: 12/489,801

(22) Filed: Jun. 23, 2009

(65) Prior Publication Data
US 2010/0005904 A1    Jan. 14, 2010

(30) Foreign Application Priority Data
Jul. 8, 2008  (JP) .................................. 2008-178050

(51) Int. Cl.
G01F 1/42   (2006.01)
G01F 1/37   (2006.01)
F16K 31/12  (2006.01)

(52) U.S. Cl. ................ 73/861.61; 73/861.52; 137/487.5
(58) Field of Classification Search ........................ None
See application file for complete search history.

(56) References Cited

U.S. PATENT DOCUMENTS

| | | | | |
|---|---|---|---|---|
| 3,026,727 A | * | 3/1962 | Spurling | 73/861.62 |
| 3,610,286 A | * | 10/1971 | McGowen et al. | 138/44 |
| 5,474,103 A | * | 12/1995 | Klak | 137/315.27 |
| 5,672,832 A | | 9/1997 | Cucci et al. | |
| 5,816,285 A | * | 10/1998 | Ohmi et al. | 137/487.5 |
| 6,539,968 B1 | * | 4/2003 | White et al. | 137/10 |
| 2004/0083807 A1 | * | 5/2004 | Mudd et al. | 73/204.21 |
| 2006/0231149 A1 | * | 10/2006 | Kulkarni | 138/44 |
| 2007/0016333 A1 | * | 1/2007 | Edwards et al. | 700/282 |
| 2007/0089788 A1 | | 4/2007 | Chinnock et al. | |
| 2009/0229377 A1 | * | 9/2009 | Ushigusa et al. | 73/861.61 |

FOREIGN PATENT DOCUMENTS

| | | |
|---|---|---|
| EP | 1 912 105 A1 | 4/2008 |
| JP | 05-233068 A | 9/1993 |
| JP | 11183213 | 7/1999 |

OTHER PUBLICATIONS

Communication (Extended European Search Report) dated Oct. 10, 2009 issued Oct. 6, 2009 by the European Patent Office in related European Application No. 09163470.9 (5 pages).

* cited by examiner

*Primary Examiner* — Harshad Patel
(74) *Attorney, Agent, or Firm* — Robert P. Michal; Lucas & Mercanti, LLP

(57) ABSTRACT

A differential-pressure flow meter is capable of easily eliminating adhesion to an orifice of an extraneous material. The differential-pressure flow meter includes: a pair of pressure sensors provided on a straight pipe part of a main fluid channel; an orifice unit interposed between the pair of pressure sensors; a columnar orifice body provided on the main fluid channel to be detachable in a direction orthogonal to a flow direction of a fluid in the main fluid channel; and an orifice hole penetrating the orifice body in the flow direction of the fluid, wherein the orifice body is rotatable at a prescribed installation position to reverse an upstream side and a downstream side with respect to the orifice hole, and flow rate measurement is performed by converting into a flow rate a difference in pressure that is obtained from two pressure values sensed respectively by the pair of pressure sensors.

4 Claims, 4 Drawing Sheets

FLOW DIRECTION OF FLUID

DIFFERENTIAL-PRESSURE FLOW METER AND FLOW-RATE CONTROLLER

BACKGROUND OF THE INVENTION

1. Field of the Invention

The present invention relates to a differential-pressure flow meter and a flow-rate controller for use in a fluid transport pipe in various industrial fields including chemical plants, semiconductor manufacturing, foods, and biotechnology.

This application is based on Japanese Patent Application No. 2008-178050, the content of which is incorporated herein by reference.

2. Description of Related Art

There is a differential-pressure flow meter conventionally and widely used for measuring a flow rate of a fluid. Such a differential-pressure flow meter includes pressure sensors in front of as well as in the rear of an orifice, and is used at a position to measure a pressure of a fluid containing a corrosive chemical such as nitric acid, hydrochloric acid, and hydrofluoric acid, of high purity, as in a semiconductor manufacturing process. Specifically, there is used a chemical solution containing hydrofluoric acid or the like upon etching a semiconductor substrate in a semiconductor manufacturing apparatus. In order to stably supply this chemical solution, such a differential-pressure flow meter is incorporated in a circulation loop of the chemical solution.

This differential-pressure flow meter includes the pair of pressure sensors respectively located upstream and downstream of the orifice in a main fluid channel, and is thus used for calculation of a flow rate by converting a difference in pressure between the two pressure sensors. The differential-pressure flow meter functions as a flow-rate controller that performs feedback control of the flow rate in the main fluid channel to have a desired value by controlling an opening of a variable valve so as to change the flow rate calculated by the flow meter to be equal to a preliminarily set flow rate (refer to Japanese Unexamined Patent Application, Publication No. Hei 5-233068, FIG. 1, or the like).

In the differential-pressure flow meter and the flow-rate controller described above, what is important as a preliminary condition for accurate flow rate measurement as well as accurate flow rate control is to maintain a constant opening of the orifice necessary for measurement of the difference in pressure.

In a case of using a slurry fluid, which can be easily solidified, the diameter of the orifice is sometimes reduced due to a solid substance that is generated by solidification of the fluid and adheres to the orifice. Such adhesion of the solid substance causes an erroneous difference in measured flow rate. In order to avoid such an erroneous difference, when there is an extraneous material such as a solid substance adhering to an orifice, the solid substance is usually washed away in rinse with use of a fluid cleaner flowing in a same direction as the chemical solution flows.

However, the solid substance generated from the chemical solution or the like adheres so strongly that it often remains unremoved by such an ordinary cleaning treatment. Accordingly, when the solid substance from the chemical solution adheres to the orifice, required is a cleaning treatment of disassembling and washing the peripheral part of the orifice in the differential-pressure flow meter or a reverse-current cleaning, in which a fluid cleaner flows in a direction opposite to the normal flow direction. It is pointed out that such a disassembling treatment and a reverse cleaning treatment require much time and effort. Furthermore, the reverse cleaning treatment of flowing a fluid cleaner in the direction opposite to the normal direction is impractical since the fluid cleaner flows in the direction opposite to the normally expected flow direc9on also in adjacent devices, resulting in unexpected troubles.

BRIEF SUMMARY OF THE INVENTION

Because of the above backgrounds, a differential-pressure flow meter and a flow-rate controller with use of an orifice are desirably configured to be capable of easily eliminating adhesion to the orifice of an extraneous material such as a solid substance so as to start accurate measurement and control of a flow rate.

In view of the above circumstances, it is an object of the present invention to provide a differential-pressure flow meter and a flow-rate controller configured to be capable of, even in a case where an extraneous material such as a solid substance adheres to an orifice, easily eliminating such adhesion of the extraneous material such as the solid substance.

In order to achieve the above object, the present invention adopts the following measures.

According to a first aspect of the present invention, a differential-pressure flow meter includes: a pair of pressure sensors provided on a straight pipe part of a main fluid channel; an orifice interposed, between the pair of pressure sensors; a columnar orifice body, provided on the main fluid channel, so as to be detachable in a direction orthogonal to a flow direction of a fluid in the main fluid channel; and an orifice hole penetrating the orifice body in the flow direction of the fluid, wherein the orifice body is configured to be rotatable at a prescribed installation position so as to reverse an upstream side and a downstream side with respect to the orifice hole, and flow rate measurement is performed by converting into a flow rate a difference in pressure that is obtained from two pressure values sensed respectively by the pair of pressure sensors.

Such a differential-pressure flow meter includes a columnar orifice body provided on the main fluid channel so as to be detachable in a direction orthogonal to a flow direction of a fluid in the main fluid channel, and an orifice hole penetrating the orifice body in the flow direction of the fluid, in which the orifice body is made rotatable at a prescribed installation position so as to reverse an upstream side and a downstream side with respect to the orifice hole. Therefore, in a case where an extraneous material such as a solid substance adheres to the orifice, such an extraneous material can be easily removed by a cleaning treatment of flowing a fluid cleaner in an ordinary flow direction of the fluid with the upstream side and the downstream side of the orifice body being reversed.

In the first aspect, the orifice body is preferably configured to be fixed at each of a first and second orifice positions where the upstream side and the downstream side are reversed. In this configuration, the orifice body in normal use of the orifice can be securely fixed at a predetermined orifice position, namely, the first or second orifice position. There is preferably provided a distinction part for distinguishing the flow directions and she like so as to be visually distinguishable which one of the first and second orifice positions is selected.

In the first aspect, preferably there is further included a cover member configured to prevent the orifice body from being detached at a fixed position, in which the cover member is configured to slide between the fixed position and a detachable position respectively set in the flow direction in the main fluid channel. The cover member prevents detachment of the orifice body that is thus securely fixed at the predetermined fixed position. The orifice body can be easily pulled out by sliding the cover member to the detachable position, so that the orifice body is easily attached and detached for replacement.

According to a second aspect of the present invention, a flow-rate controller includes: the differential-pressure flow meter described above; and a flow control valve provided on the main fluid channel, in which the flow control valve controlled to have an opening so as to keep within a predetermined range a difference between a flow rate value measured by the differential-pressure flow meter and a preliminarily set flow rate value.

Such a flow-rate controller includes the differential-pressure flow meter described above, and a flow control valve provided on the main fluid channel and controlled to have a valve opening so as to keep within a predetermined range a difference between a flow rare value measured by the differential-pressure flow meter and a preliminarily set flow rate value. Therefore, in a case where an extraneous material such as a solid substance adheres to the orifice of the differential-pressure flow meter, such an extraneous material can be easily removed by a cleaning treatment of flowing a fluid cleaner in an ordinary flow direction of the fluid with the upstream side and the downstream side of the orifice body being reversed.

With use of the differential-pressure flow meter and the flow-rate controller according to the present invention described above, adhesion to the orifice of an extraneous material such as a solid substance can be easily eliminated by cleaning with the orifice body being reversed. Therefore, the differential-pressure flow meter and the flow-rate controller enable accurate flow rate measurement as well as accurate flow rate control to be restarted in a short period of time.

In a case where an extraneous material cannot be removed by cleaning or in a case where the diameter of the orifice is required to be changed, the orifice body can be easily pulled out and replaced by sliding the cover member to the detachable position. That is, there is no need to disassemble the pipe connected to the main fluid channel on which the orifice is located, or the components. The orifice body can be easily and securely replaced with a minimum operation of sliding the cover member.

DETAILED DESCRIPTION OF THE INVENTION

Below described with reference to the drawings are a differential-pressure flow meter and a flow-rate controller according to an embodiment of the present invention.

Figure 1:
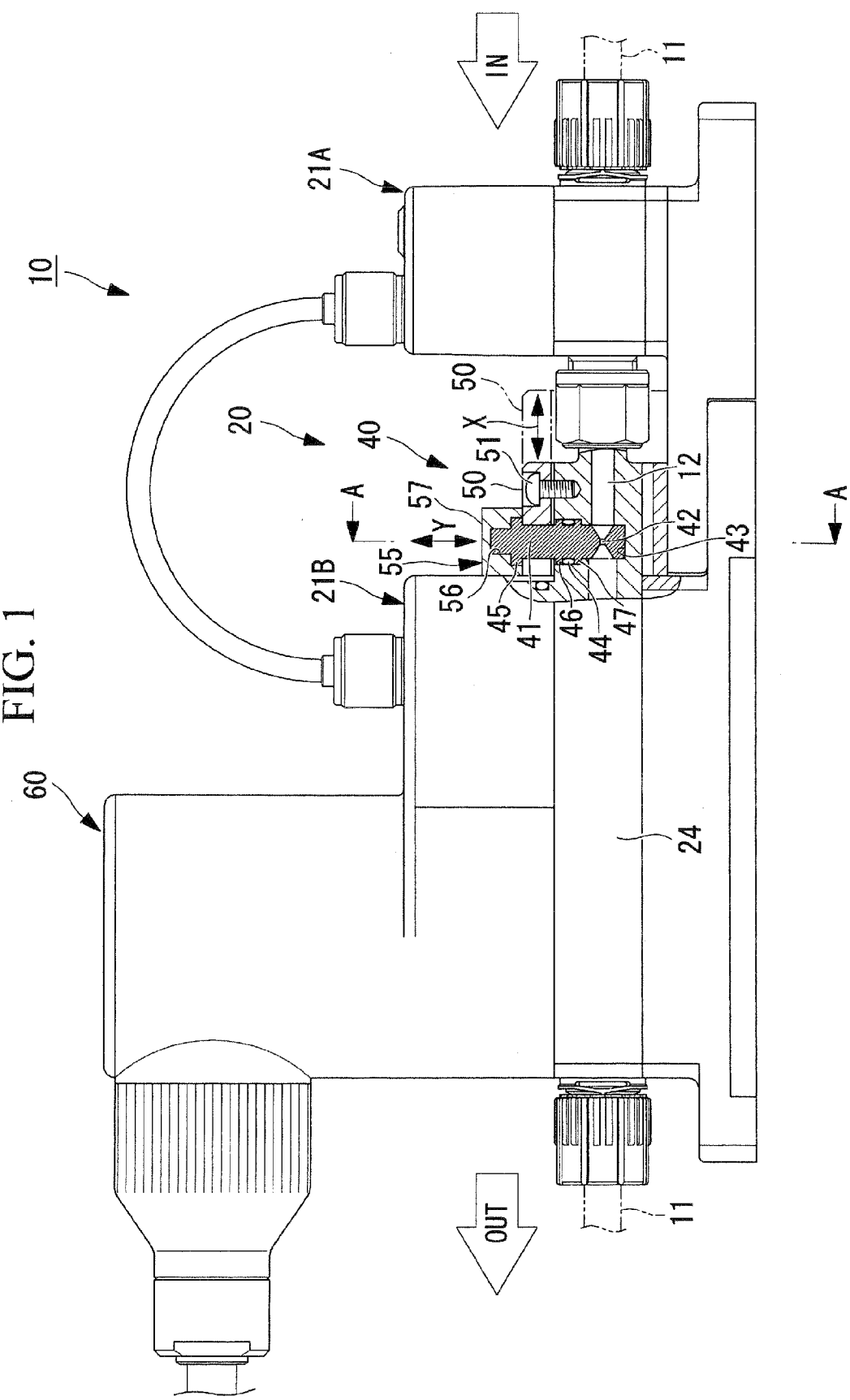
FIG. 1 is a front view of an exemplary configuration of an entire flow-rate controller according to an embodiment of the present invention, with a main portion being shown in cross-section.
Figure 2:
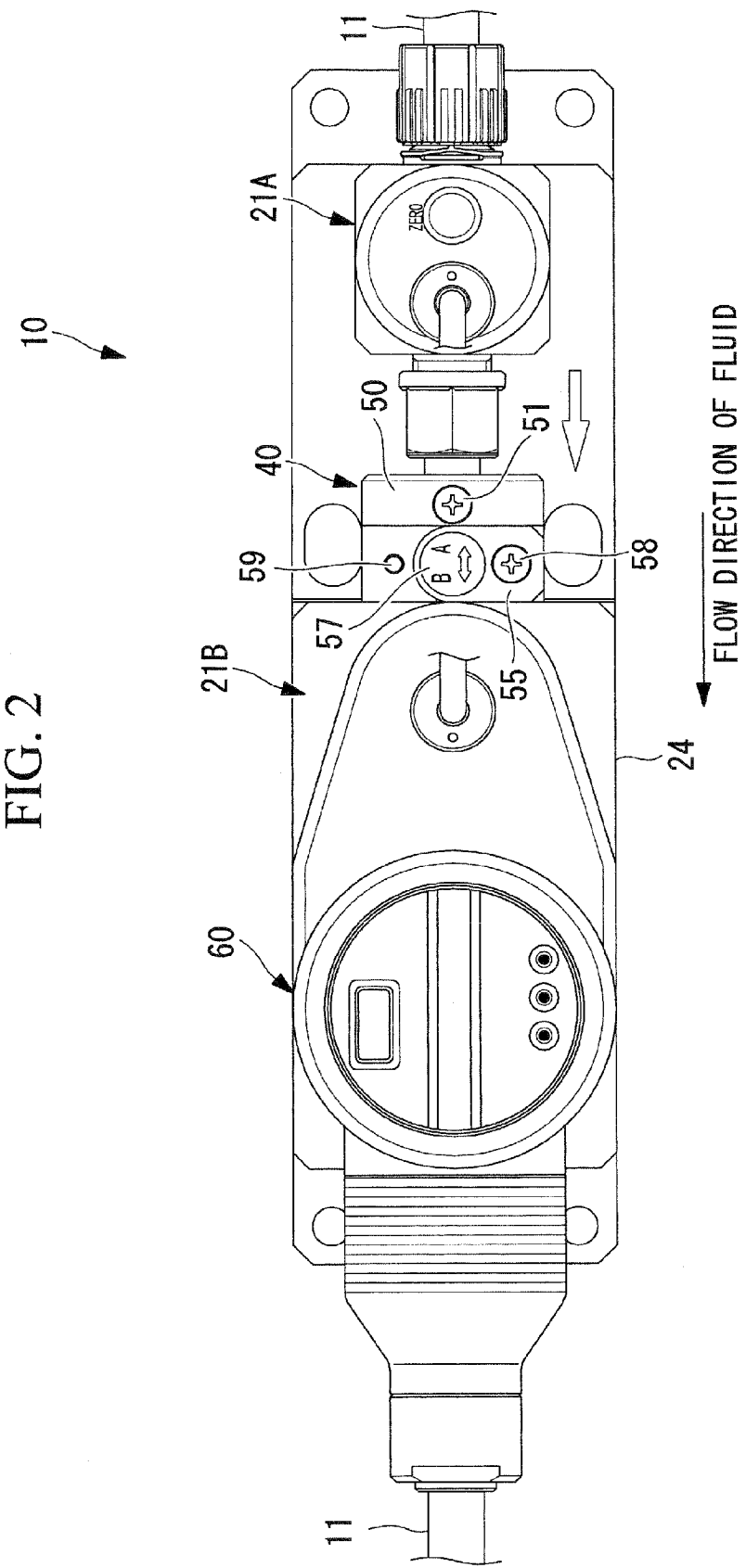
FIG. 2 is a plan view of the flow-rate controller shown in FIG. 1.
Figure 3:
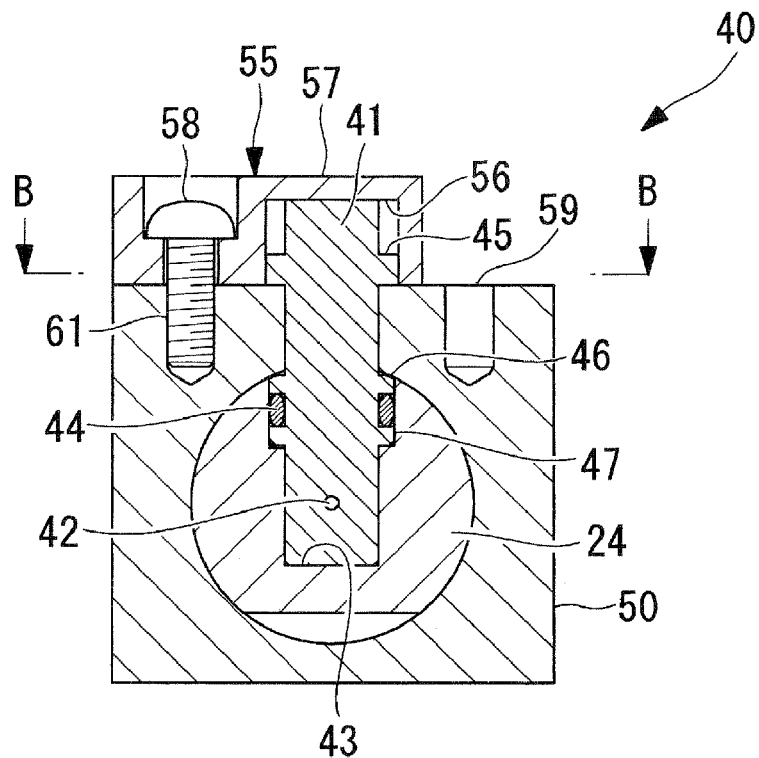
FIG. 3 is a cross-sectional view of the flow-rate controller cut along line A-A in FIG. 1.
Figure 4:
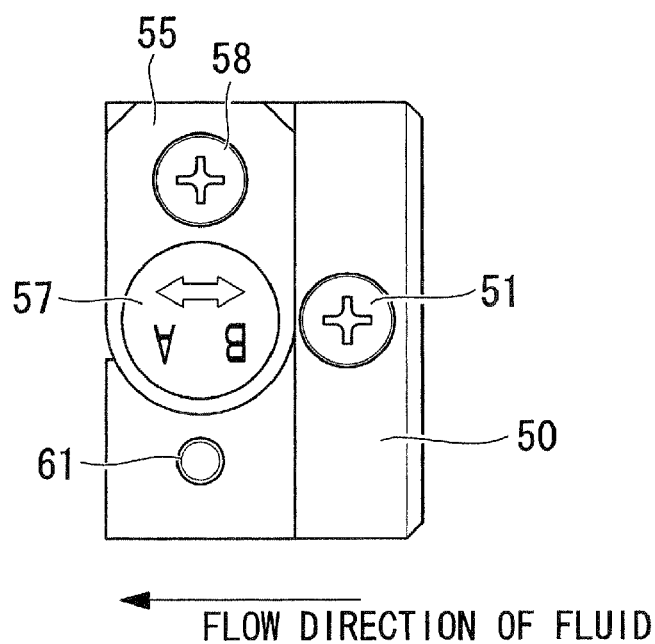
FIG. 4 is a plan view showing a position of a lever with an upstream side and a downstream side being reversed in an orifice body in FIG. 2.

In the embodiment shown in FIGS. 1 to 5, FIG. 1 is a front view of a flow-rate controller 10 with a main portion thereof being shown in cross-section, FIG. 2 is a plan view of the flow-rate controller 10 shown in FIG. 1, and FIG. 3 is a vertical cross-sectional view (cut along line A-A in FIG. 1) of an orifice unit in FIG. 1. The flow-rate controller 10 is incorporated in a pipe 11 that is communicated with a main fluid channel 12 to be described later, and controls to constantly maintain a flow rate of a fluid (such as a chemical solution) flowing in the fluid channel. The flow-rate controller 10 includes a differential-pressure flow meter 20 that measures an actual flow rate of a fluid, and a flow control valve 60 that allows an opening of a valve to be controlled. The differential-pressure flow meter 20 is located upstream of the flow control valve 60 in a direction of the fluid flowing in the main fluid channel 12.

The differential-pressure flow meter 20 has a pair of pressure sensors 21A and 21B that are disposed in series with an orifice unit 40 interposed therebetween. In the differential-pressure flow meter 20, the pressure sensors 21A and 21B respectively sense fluid pressures differentiated from each other as the fluid passing through the orifice unit 40, which is disposed on a straight pipe part of the main fluid channel 12, is reduced in pressure. The two pressure values sensed by the pressure sensors 21A and 21B are respectively converted into electrical signals and are inputted to a controller (not shown).

The controller thus receives the signals of the pressure values and converts a difference in pressure obtained from the two pressure values into a flow rate so as to measure the flow rate of the fluid flowing in the main fluid channel.

In the following, the pressure sensors 21A and 21B are distinguished from each other when necessary such that the pressure sensor 21A located upstream of the orifice unit 40 is referred to as a first sensor and the pressure sensor 21B located downstream thereof is referred to as a second sensor.

The pressure sensors 21A and 21B used herein are configured by locating sensor bodies on pressure introducing channels that are branched upwards from the main fluid channel 12 into a T-letter shape. However, these pressure sensors 21A and 21B are not particularly limited as long as being capable of sensing fluid pressures. Further, the sensor bodies are not particularly limited, while preferably employed are pressure sensors of the piezo type, of the capacitance type, or of the strain gage type.

In the configuration exemplified in the drawings, the orifice unit 40 is integrally incorporated with the downstream sensor 21B. However, the present invention is not limited thereto. Further, the second sensor 21B has a body 24 (to be described later) provided integrally with the flow control valve 60, and the main fluid channel 12 is formed in the body 24. In other words, the second sensor 21B shown in the drawings is configured integrally with the orifice unit 40 and the flow control valve 60 by sharing the body 24 therewith.

The orifice unit 40 has a columnar orifice body 41 that is provided on the straight pipe part of the main fluid channel 12 so as to be detachable in a direction orthogonal to the flow direction of the fluid. The flow direction of the fluid in this case is along the direction from the right (IN) to the left (OUT) on the sheets as indicated by arrows in the drawings. The direction orthogonal to the flow direction of the fluid is along the up-and-down (vertical) direction as indicated by arrow Y in the drawing. In other words, in the flow-rate controller 10 and the differential-pressure flow meter 20 shown in the drawings, the straight pipe part of the main fluid channel 12 is provided along the horizontal direction, and the orifice body 41 is attachable and detachable by being inserted and being pulled out along the vertical direction, which is orthogonal to the horizontal direction.

The orifice body 41 has a horizontally symmetric orifice hole 42 penetrating in the flow direction of the fluid so as to restrict the cross-sectional area of the main fluid channel 12. Specifically, the orifice hole 42 has a diameter smaller than that of the cross-section of the main fluid channel 12. The orifice hole 42 causes resistance of a fluid channel when the fluid passes through the orifice hole 42, so that a difference in pressure is generated between the upstream side and the downstream side thereof. The orifice body 41 is located at a predetermined position such that the center of the orifice hole 42 coincides with the axis of the main fluid channel 12. In other words, in a state where the orifice body 41 is inserted to reach the predetermined position in a mounting hole 43 that is vertically provided in the body 24, the center of the orifice hole 42 is positioned on the shaft axis of the main fluid channel 12.

The orifice body 41 described above is made rotatable at the prescribed installation position. When the orifice body 41 is rotated by 180 degrees, the upstream side and the downstream side can be reversed with respect to the orifice hole 42. The columnar orifice body 41 has the orifice hole 42 that is formed to have the upstream side and the downstream side symmetric with respect thereto in the flow direction of the fluid.

There is provided an O-ring 44, as shown in the drawings, so as to seal a gap between the main fluid channel 12 and an opening of the mounting hole 43 on the side from which the orifice body 41 is inserted. The fluid is therefore prevented from leaking from the main fluid channel 12.

The above orifice body 41 is provided with three flanges 45, 46, and 47 that, each project on an entire periphery from a columnar outer peripheral surface thereof.

Figure 5:
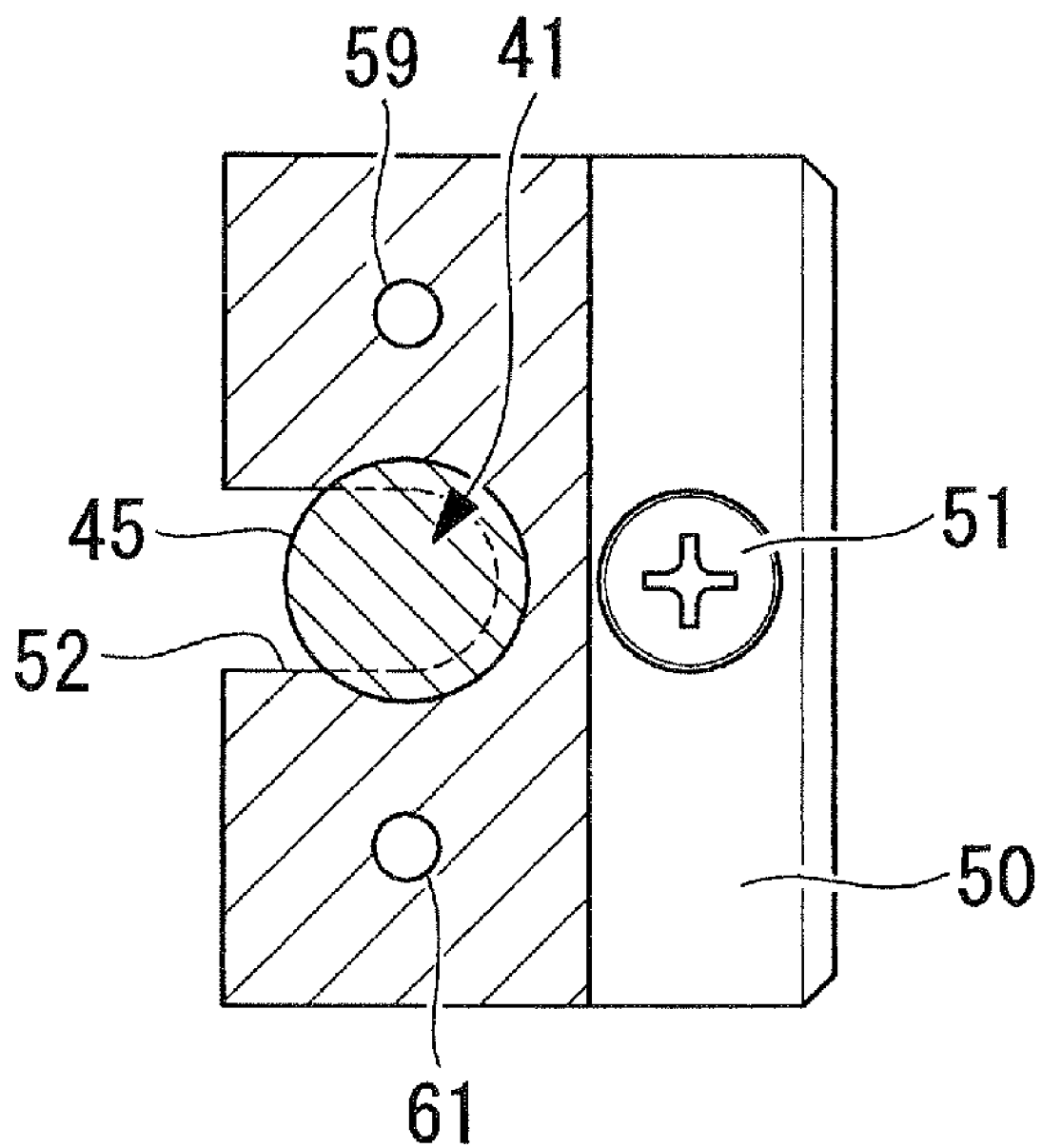
FIG. 5 is a cross-sectional view (cut along line B-B in FIG. 3) of a cover member and an orifice body with the lever removed therefrom.

Among these, the sealing O-ring 44 described above is mounted between the lower two flanges 46 and 47. The flange 46 has an upper end surface that is locked by a lower end surface of a cover member 50. Specifically, the orifice body 41 is inserted into the mounting hole 43 provided in the body 24 to be mounted at the predetermined position, and is then retained at the predetermined position so as not to be released by the cover member 50 that is fixed to the body 24 using a screw 51. The cover member 50 in this case is slidable between a fixed position and a detachable position along the outer peripheral surface of the body 24 in the horizontal direction along the flow direction of the fluid as indicted by arrow X in the drawing. The cover member 50 is made slidable by the body 24 having the guide function to guide the cover member 50 as well as by provision of a locking hole 52 in a substantially U-letter shape, such as shown in FIG. 5 (a cross-sectional view cut along line B-B in FIG. 3). The locking hole 52 allows the downstream side in the flow direction of the fluid to be communicated and enables the orifice body 41 to pass therethrough.

The fixed position of the cover member 50 is indicated by solid lines in FIG. 1. The orifice body 41 can be retained at the predetermined position for use so as nor to be released from the fixed position. In this state, the cover member 50 is fixed to the body 24 using the screw 51.

The detachable position of the cover member 50 is indicated by imaginary lines in FIG. 1. After the screw 51 is removed to release the cover member 50, the cover member 50 slides upstream along the flow direction of the fluid to reach the detachable position, where cover member 50 is unlocked from the upper end surface of the flange 46. Therefore, at this detachable position, the orifice body 41 located at the predetermined position for use can be pulled upwards and be removed.

As described above, the cover member 50 is provided to prevent the orifice body 41 from being detached as well as to retain the orifice body 41 at the fixed position, and the cover member 50 is made slidable between the fixed position and the detachable position each set in the flow direction of the main fluid channel 12. Accordingly, the orifice body 41 can be securely fixed by the cover member 50 that is fixedly located by the screw at the predetermined position to prevent the orifice body 41 from being detached. When the screw 51 is removed so as to allow the cover member 50 to slide to the detachable position, the orifice body 41 can be easily pulled out. Therefore, no operation such as disassembling the differential-pressure flow meter 20 is required but the orifice body 41 can be easily attached and detached for replacement.

The above orifice body 41 is fixed so as not to be shifted due to rotation or the like at each of two orifice positions with the upstream side and the downstream side being reversed.

In the configuration shown in the drawings, there is mounted at an upper end of the orifice body 41 a lever 55 for use in rotational operations. The lever 55 may have a concave part 56 that allows the upper part of the orifice body 41 to be fitted thereinto. Rotation of the lever 55 is restricted due to engagement between an inner wall surface of the concave part 56 and a plane part that is formed by partially removing the columnar outer peripheral surface, so that the lever 55 can be rotated integrally with the orifice body 41.

The lever 55 is provided on an upper surface thereof with a distinction part for distinction of the flow directions so as to be visually distinguishable which one of the two orifice positions is selected.

In the example shown in the drawings, there is provided a display part 57 that has letters "A" and "R" that are displayed aside respective outline arrows indicating the flow directions. Accordingly, in normal use of the orifice, the orifice hole 42 in the orifice body 41 capable of reversing the upstream side and the downstream side, the current fixed position is distinguished easily and accurately by viewing the display part 57, between a first orifice position (refer to FIG. 2) allowing the fluid to flow from A to B and a second orifice position (refer to FIG. 4) allowing the fluid to flow from B to A.

The above orifice body 41 can be fixed respectively at the first orifice position as well as at the second orifice position where the upstream, side and the downstream side are reversed. In the configuration exemplified in the drawings, the lever 55 is configured to be fixed using the screw 51 to the cover member 50, which is fixed to the body 24. Thus, as the orifice body 41 and the lever 55 are fixed together so as to be rotated integrally with each other, the orifice body 41 is securely fixed at a desired orifice position to the main fluid channel 12, the body 24, and the like.

There are also shown in the drawings a screw hole 59, a screw 53, and a screw hole 61. The screw hole 59 is used for fixing the lever 55 at the second orifice position, while the screw hole 61 is used for fixing the lever 55 at the first orifice position.

As described above, in the differential-pressure flow meter 20 provided with the pair of pressure sensors 21A and 21B on the straight pipe part of the main fluid channel 12 as well as with the orifice unit 40 interposed therebetween, flow rate measurement is performed by converting into a flow rate a difference in pressure between two pressure values sensed respectively by the pressure sensors 21A and 21B. In this differential-pressure flow meter 20 as well as the flow-rate controller 10 including the differential-pressure flow meter 20, the columnar orifice body 41 is detachably provided in the direction orthogonal to the flow direction of the fluid along the main fluid channel 12, the orifice body 41 is provided with the orifice hole 42 penetrating along the flow direction of the fluid, and the upstream side and the downstream side can be reversed with respect to the orifice hole 42 by rotating the orifice body 41 at the prescribed installation position. Therefore, in a case where an extraneous material such as a solid substance adheres to the orifice hole 42 in the orifice unit 40, the extraneous material can be removed by a cleaning treatment with the upstream side and the downstream side of the orifice body 41 being reversed.

Specifically, when the cleaning treatment is performed with the upstream side and the downstream side of the orifice body 41 being reversed in order to wash away an extraneous material such as a solid substance that cannot be removed by the cleaning treatment of flowing a fluid cleaner in an ordinary flow direction, it is possible to achieve a cleaning effect similar to that obtained by the reverse cleaning treatment of flowing a fluid cleaner in the direction opposite to the normal direction. Moreover, the cleaning treatment according to the present invention does not cause any change in the flow direction of the fluid cleaner itself, thereby preventing unexpected troubles such as a damage to an adjacent device due to such reverse in flow direction as in the conventional reverse cleaning treatment of reversing the flow direction.

Therefore, the configuration described above enables the cleaning treatment of flowing a fluid cleaner in an ordinary flow direction to exert removal of an extraneous material similar to that obtained by the conventional reverse cleaning treatment, so that the extraneous material can be removed safely as well as easily.

With use of the differential-pressure flow meter 20 and the flow-rate controller 10 described above, adhesion to the orifice hole 42 of an extraneous material such as a solid substance can be easily eliminated by cleaning with the orifice body 41 being reversed. Therefore, the differential-pressure flow meter 20 and the flow-rate controller 10 enable accurate flow rate measurement as well as accurate flow rate control to be restarted in a short period of time.

In a case where an extraneous material cannot be removed by cleaning or in a case where the diameter of the orifice is required to be changed, the orifice body 41 can be easily pulled out and replaced by sliding the cover member 50 to the detachable position. That is, there is no need to disassemble the pipe 11 connected to the main fluid channel 12 on which the orifice unit 40 is located, or the components such as the pressure sensors 21A and 21B. The orifice body 41 can be easily and securely replaced with a minimum operation of sliding the cover member 50.

It should be noted that the present invention is not limited to the embodiment described above, but may be appropriately modified without departing from the gist of the invention.

What is claimed is:

1. A differential-pressure flow meter comprising:
    a pair of pressure sensors provided on a straight pipe part of a main fluid channel;
    an orifice interposed between the pair of pressure sensors;
    a columnar orifice body, provided on the main fluid channel, so as to be detachable in a direction orthogonal to a flow direction of a fluid in the main fluid channel;
    an orifice hole penetrating the orifice body in the flow direction of the fluid; and
    a distinction part for distinction of the flow direction, wherein the orifice body is configured to be rotatable at a prescribed installation position so as to reverse an upstream side and a downstream side with respect to the orifice hole, and
    flow rate measurement is performed by converting into a flow rate a difference in pressure that is obtained from two pressure values sensed respectively by the pair of pressure sensors.

2. The differential-pressure flow meter according to claim 1, wherein the orifice body is configured to be fixed at each of a first orifice position in normal use of the orifice and a second orifice position where the upstream side and the downstream side are reversed with respect to the first orifice position.

3. The differential-pressure flow meter according to claim 1, further comprising:
    a cover member configured to prevent the orifice body from being detached at a fixed position,
    wherein the cover member is configured to slide between the fixed position and a detachable position respectively set in the flow direction in the main fluid channel.

4. A flow-rate controller comprising:
    the differential-pressure flow meter of claim 1; and
    a flow control valve provided on the main fluid channel, and
    wherein the flow control valve is controlled to have an opening so as to keep within a predetermined range a difference between a flow rate value measured by the differential-pressure flow meter and a preliminarily set flow rate value.

\* \* \* \* \*